(12) United States Patent
Uhrlandt et al.

(10) Patent No.: US 6,702,887 B2
(45) Date of Patent: *Mar. 9, 2004

(54) INHOMOGENEOUS SILICAS FOR ELASTOMER COMPOUNDS

(75) Inventors: Stefan Uhrlandt, Niederkassel (DE); Ralf Schmoll, Bonn (DE); Anke Blume, Weilerswist (DE); Detlef Luginsland, Cologne (DE)

(73) Assignee: Deguss AG, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/050,540

(22) Filed: Jan. 18, 2002

(65) Prior Publication Data

US 2003/0037706 A1 Feb. 27, 2003

(30) Foreign Application Priority Data

Mar. 16, 2001 (DE) .......................................... 101 12 652

(51) Int. Cl.⁷ ............................................... C04B 14/04
(52) U.S. Cl. ....................................... 106/482; 106/481
(58) Field of Search ................................. 106/481, 482

(56) References Cited

U.S. PATENT DOCUMENTS

| 5,110,574 A | * | 5/1992 | Reinhardt et al. | .......... 423/335 |
| 5,705,137 A | * | 1/1998 | Goerl et al. | ................. 423/335 |
| 5,908,660 A | * | 6/1999 | Griffith et al. | .............. 427/220 |

FOREIGN PATENT DOCUMENTS

| EP | 0 268 763 | | 6/1988 | |
| EP | 0 272 380 | | 6/1988 | |
| EP | 0 942 029 | | 9/1999 | |
| EP | 0 942 029 A2 | * | 9/1999 | .............. C08J/3/00 |
| JP | 08133720 A | * | 5/1996 | ........... C01B/33/18 |

OTHER PUBLICATIONS

Patent Abstracts of Japan, JP 8–133720, May 28, 1996.
Patent Abstracts of Japan, JP 6–001605, Jan. 11, 1994.

* cited by examiner

*Primary Examiner*—C. Melissa Koslow
*Assistant Examiner*—Shalie Manlove
(74) *Attorney, Agent, or Firm*—Oblon, Spivak, McClelland, Maier & Neustadt, P.C.

(57) ABSTRACT

A silica having a high degree of dispersibility and a low dust concentration contains at least two silica fractions that differ by at least 10% in at least one value of BET or CTAB surface area or DBP absorption.

23 Claims, No Drawings

INHOMOGENEOUS SILICAS FOR ELASTOMER COMPOUNDS

BACKGROUND OF THE INVENTION

1. Field of the Invention

The present invention relates to a silica with an inhomogeneous structure and a manufacturing process thereof.

2. Discussion of the Background

Easily dispersible silicas are manufactured by precipitating water glass with sulfuric acid and subsequent drying as described in EP 0 901 986 and EP 0647 591. The dried products are then ground and/or granulated.

Any silica can be manufactured dust-free by mechanical granulation. However, generally this additional process stage reduces the level of dispersibility.

In another process, silicas are also manufactured by acidic precipitation. However, these are dried by means of atomization in hot air and, at the same time, formed into easily destructible spheres. For instance, EP 018 866 describes the manufacture of spray-dried silica with an average particle diameter of more than 80 µm, where the particles have a homogeneous structure and are solid.

Spray-dried silicas are particularly suitable as fillers, as they are very easily dispersible. The dispersibility is a very important criterion for the processing of the silica, as a homogeneous and rapid intermingling in the respective matrix has a high economic significance. In addition to dispersibility, the specific surface areas (BET, CTAB) and the oil absorption capacity (DBP) are important characteristics.

However, not all silicas can be manufactured dust-free by spray drying. Generally, no one type of silica is able to fulfill all the required criteria. A mixture of several types of silica can only be manufactured with a high degree of dust due to the above-mentioned high degree of dispersibility (i.e. low mechanical stability).

It is therefore desirable to manufacture a silica that covers a wide range of properties such as BET and CTAB surface area with a high degree of dispersibility but with a low dust concentration. As explained above, this cannot be achieved for all silicas through spray drying or granulation.

SUMMARY OF THE INVENTION

It is therefore an object of the present invention to provide a silica having large BET and CTAB surface areas and a high degree of dispersibility combined with a low dust concentration.

It is another object of the present invention to provide a process for the manufacture of such silica.

These and other objects have been achieved by the present invention, the first embodiment of which includes a silica, comprising:
  at least two silica fractions;
  wherein at least two silica fractions differ by at least 10% in at least one measured value for a BET surface area, a CTAB surface area and a DBP absorption.

Another embodiment includes a process for manufacturing a silica containing at least two silica fractions, comprising:
  mixing at least two silica fractions which differ by at least 10% in at least one measured value for a BET surface area, a CTAB surface area and a DBP absorption.

DETAILED DESCRIPTION OF THE INVENTION

It was surprisingly discovered that silica with an inhomogeneous structure can be easily adapted to suit the specific requirements of large BET and CTAB surface areas and still demonstrate a good degree of dispersibility.

Subject of the present invention is therefore a silica containing at least two silica fractions which differ in at least one measured value for a BET surface area, a CTAB surface area and a DBP absorption by at least 10%.

The silica that is the subject of the present invention is therefore particularly suitable as a filler in an article made of an elastomer compound, such as a tire.

The structure of the silica consisting of at least two silica fractions causes the silica to become inhomogeneous, which is reflected in a particularly good degree of dispersibility and a low concentration of fine particles.

The silica according to the present invention has a fine particle concentration of no more than 10%, preferably no more than 5% and most preferably no more than 2.5%, with an average particle diameter of 63 µm or less, preferably 60 µm or less and most preferably 55 µm or less (Alpine screen residue).

A similar concept is described in EP 0 942 029. In this case, rubber compositions are described that contain precipitated silicas with two different aggregate sizes. The different aggregate sizes are used to facilitate easy dispersibility of the silicas in the rubber compound.

However, the different silica fractions in the present invention are not described. Besides, a different aggregate size of the silica fractions in this case is of subordinate importance. What is important are the differences in properties, such as BET and CTAB surface areas and DBP absorption.

"Silica fractions" within the meaning of the present invention are used to describe various types of silica, which, due to different manufacturing processes or variants, exhibit a difference of at least 10% in at least one of the above-mentioned properties. Preferably two, particularly preferably three of these parameters exhibit such a difference.

The differences in the above parameters can be obtained through different manufacturing processes for the silica fractions. For instance, all, one, or several of the silica fractions can be precipitated silica and/or fumed silica. In the case of precipitated silica, it is particularly possible to obtain different silica fractions through different precipitation processes. Silica according to the present invention can also be manufactured from fractions of precipitated silica and fumed silica.

Various precipitation methods are known for precipitated silica and are described, for example, in EP 0 901 986, EP 0 937 755, EP 0 643 015, or EP 0 647 591. In these examples, two precipitated silicas from different manufacturing processes are processed into inhomogeneous silica according to the present invention. It is also possible to combine hydrophobized silica fractions with untreated silica fractions to create a silica according to the present invention.

The silica fractions can be precipitated silica or fumed silica. The fractions can also be mixed during the different process stages that are usually carried out during the manufacture of silica.

When fractions of precipitated silica are used, after the silicate has been precipitated with an acid (as a rule, water glass, i.e. sodium silicate with sulfuric acid), the mixture can be produced by mixing the precipitation suspensions or the filter cakes obtained after the suspensions have been filtered or by mixing the re-suspended filter cakes. It is also possible to add previously manufactured, dried or hydrophobized silica fractions as a solid substance to the suspension.

The thus obtained compounds must be filtered off and dried in the usual manner.

Drying can occur, for example, in a spray drier, a jet drier, a rack drier, a rotary drier, or a spin-flash drier.

After the drying process it is possible to grind and/or granulate the mixture.

It is also possible to mix the silica fractions in a dry state. In this case they can be re-suspended with the above-mentioned subsequent drying stages and/or grinding/granulation.

Silica according to the present invention can exhibit the following properties:

a BET surface area of 80–300 $m^2/g$, preferably 80–230 $m^2/g$;

a CTAB surface area of 80–300 $m^2/g$, preferably 80–230 $m^2/g$; and a DBP absorption of 150–350 g/100 g, preferably 200–300 g/100 g.

These data refer to the silica according to the present invention as such and not to the silica fractions.

As described, the above properties of the silica fractions must differ by at least 10%, preferably at least 15%, particularly preferably at least 20%.

The above properties are determined by the following methods:

| | |
|---|---|
| BET surface area: | Areameter from Ströhlein, according to ISO 5794/ Annex D, |
| CTAB surface area: | at pH 9, according to Jay, Janzen and Kraus in "Rubber Chemistry and Technology" 44 (1971) 1287, and |
| DBP factor: | ASTM D 2414-88. |

A further subject of the present invention is a process for the manufacture of a silica containing at least two silica fractions that differ by at least 10% in at least one measured value for a BET surface area, CTAB surface area and a DBP absorption. In this process the silica fractions are mixed with one another.

The amounts of the respective fractions in the suspension or, respectively, in the silica are between 5 and 95% by weight based on the dry silica. The amount of each fraction in the suspension includes 10, 20, 30, 40, 50, 60, 70, 80 and 90% by weight based on the dry silica.

The silica is preferably obtained in particle form with an average diameter of more than 80, preferably more than 100, particularly preferably more than 200 μm, for example, by spray drying. Spray drying the suspension can, for example, be carried out according to U.S. Pat. No. 4,097,771.

The silica according to the present invention can therefore be used as a filler in an elastomer compound, especially if that elastomer compound is used for tires.

The silica according to the present invention can also be used in all application areas where silicas are normally used, such as in a battery separator, in an anti-blocking agent, in a matting agent in paint, in a paper coating and in a defoaming agent.

A further subject of the invention is an elastomer compound containing the silica according to the present invention.

The silica according to the present invention or the silica fractions can be hydrophobized with a silane and can be modified especially with an organosilane of the formulae I–III,

     (I)

     (II)

     (III), where the symbols stand for the following:

| | |
|---|---|
| B: | —SCN, —SH, —$C_1$, $NH_2$ (if q = 1) or $S_x$- (if q = 2); |
| R and $R^1$: | an alkyl group with 1 to 4 carbon atoms, a phenyl group, in which all R and $R^1$ residues can have the same or a different meaning; |
| R: | a $C_1$–$C_4$-alkyl, $C_1$–$C_4$-alkoxyl group; |
| n: | 0; 1 or 2; |
| Alk: | a bivalent, unbranched or branched hydrocarbon group with 1 to 6 carbon atoms; |
| m: | 0 or 1; |
| Ar: | an aryl group with 6 to 12 C atoms, preferably 6 C atoms; |
| p: | 0 or 1, subject to the proviso that p and n are not both 0 at the same time; |
| x: | a number between 2 and 8; |
| Alkyl: | a monovalent, unbranched or branched unsaturated hydrocarbon group with 1 to 20 carbon atoms, preferably 2 to 8 carbon atoms; |
| Alkenyl: | a monovalent, unbranched or branched unsaturated hydrocarbon group with 2 to 20 carbon atoms, preferably 2 to 8 carbon atoms. |

The modification with organosilanes can be carried out in mixtures of 0.5 to 50 parts organosilane based on 100 parts silica or silica fraction, in particular 2 to 15 parts of organosilane based on 100 parts silica or silica fraction. The amount of organosilane includes all values and subvalues therebetween, especially including 1, 2, 3, 4, 5, 6, 7, 8, 9, 10, 11, 12, 14, 15, 20, 25, 30, 35, 40 and 45 parts based on 100 parts silica or silica fraction. In this case the reaction between the silica or silica fractions and silane can be carried out during the production of the mixture (in situ) or separately (premodified).

In a preferred embodiment of the invention, bis(triethoxysilylpropyl)-tetrasulfane can be used as a silane.

The silica according to the present invention can be incorporated into an elastomer compound or a vulcanizable rubber compound as a reinforcing filler in quantities of 5 to 200 parts based on 100 parts of rubber; as a powder, microbeads or granules either with or without silane modification. The quantity of the filler includes all values and subvalues therebetween, especially including 10, 20, 30, 40, 50, 60, 70, 80, 90, 100, 110, 120, 130, 140, 150, 160, 170, 180 and 190 parts based on 100 parts of rubber.

One or more of the above-mentioned silanes can be added to an elastomer together with the silica according to the present invention. In this case the reaction between the filler and the silane during the mixing process proceeds at a high temperature (in-situ modification) or using a previously premodified form (for example, DE-PS 40 04 781). In other words, both reaction partners react separately from the actual production of the mixture.

The elastomer can contain compounds which contain solely a silica according to the present invention, which is unmodified or modified with organosilane according to formulae I to III as a filler. In addition, the elastomer can also be filled with one or more, more or less reinforcing fillers. A blend of carbon blacks (for example furnace, gas, or acetylene blacks or lampblack) with the silica according to the present invention is preferable, wherein the silica is unmodified or modified with silane. A blend of natural fillers, such as clays, siliceous chalk, or other commercial silica, with the silica according to the present invention is also preferred.

The blend ratio in this case depends on the required properties of the finished rubber mixture. The amount of silicas according to the present invention may be 5–95% based on the total amount of fillers.

In addition to the silica according to the present invention, the organosilanes and other fillers, the elastomers form a further important component of the rubber mixture. The silica according to the present invention can be used in all types of rubber with accelerators/sulfur as well as in peroxidic vulcanizable rubber types. Preferred are elastomers which are natural and synthetic, oil-extended or not, as a single polymer or a blend with other rubbers such as natural rubbers, butadiene rubber, isoprene rubber, butadiene-styrene-rubber, especially SBR, manufactured by means of the solvent polymerization process, butadiene acrylonitrile rubbers, butyl rubbers, terpolymers of ethylene, propylene and non-conjugated dienes. The following additional rubbers are preferably mixed with the above-mentioned rubbers: a carboxylic rubber, an epoxide rubber, a trans-polypentenamer, a halogenized butyl rubber, a rubber from 2-chlorine-butadiene, an ethylene-vinyl acetate copolymer, an ethylene-propylene-copolymer, if required, also a derivative of natural rubber as well as a modified natural rubber.

Further additives in their usual dosages may be used, such as a plasticizer, a stabilizer, an activator, a pigment, an antioxidant, and an auxiliary processing agent.

The silica according to the present invention, unmodified or modified with silane, is used in all rubber applications, such as tires, conveyor belts, seals, V-belts, hoses, shoe soles, etc.

A further subject of the invention is an elastomer compound, in particular a vulcanizable rubber compound, which contains silica according to the present invention in quantities of 5 to 200 parts based on 100 parts elastomer or, respectively, rubber. The quantity of silica includes all values and subvalues therebetween, especially including 20, 40, 60, 80, 100, 120, 140, 160 and 180 parts based on 100 parts elastomer or rubber. The incorporation of the silica and the manufacture of the compounds containing the silica are carried out in the way usually practiced in the rubber industry in a kneader or in a mill. The silica can be added as a powder, as microbeads or as granules.

Having generally described this invention, a further understanding can be obtained by reference to certain specific examples which are provided herein for purposes of illustration only, and are not intended to be limiting unless otherwise specified.

EXAMPLES

Determining the Alpine Screen Residue

In order to determine the screen residue, the silica or silicate sample was screened through a 500 μm screen to destroy any existing de-airing agglomerate. Next, 10 g of the screened sample were placed on the air-draft screen, which had been fitted with a 63 μm screen mesh, and screened with a 200 mm water column vacuum. Silica or silicate particles that settle on the screen top of the device were knocked off by carefully tapping on the handle of the screen top. As a rule, the screening process took 5 minutes. It was complete when the residue remained constant, this could generally be seen by its flowable appearance. To make sure, the screening process was continued for another minute.

If agglomerates formed, the screening process was interrupted for a short period and the agglomerate was destroyed with a brush using a slight degree of pressure. After the screening process, the screen residue was carefully knocked off the air-jet screen and weighed. The screen residue is given in percent, always in connection with the mesh size of the screen.

Calculation $$\% \text{ screen residue} = \frac{A \times 100}{E}$$

A=Weight of sample after screening in g

E=Weight of sample before screening in g

Equipment

Alpine air-draft screen, laboratory type S 200

Vacuum cleaner or blower

Air-draft screen with mesh size 63 μm according to DIN 4188

Laboratory balance

The following examples are intended to explain the invention in more detail, without limiting it to these examples.

Two silica fractions, A and B, were prepared; A according to EP 0 901 986 and B according to U.S. Pat. No. 1,043,282 and the suspensions obtained from the precipitation processes were converted further in the following way.

Example 1

The precipitation suspension of the silica fractions A and B were mixed in a ratio of 50:50. To this end, 1 m$^3$ of precipitated silica A (solids concentration approx. 85 g/l) was mixed with 0.8 m$^3$ of precipitated silica B (solids concentration approx. 63 g/l) in a stirred vessel. The mixture that was obtained was filtered; the filter cake was then liquefied with some acid and sprayed on to a jet type drier. The analysis data are summarized in Table 1.

Example 2

The precipitation suspensions of precipitated silicas A and B were mixed in a ratio of 70:30. To this end, 1.4 m$^3$ of precipitated silica A (solids concentration approx. 83 g/l) was mixed with 0.8 m$^3$ of precipitated silica B (solids concentration approx. 64 g/l) in a stirred vessel. The mixture that was obtained was filtered; the filter cake was then liquefied with some acid and sprayed on to a jet type drier. The analysis data are summarized in Table 1.

Example 3

The precipitation suspensions of precipitated silicas A and B were mixed in a ratio of 30:70. To this end, 0.6 m$^3$ of precipitated silica A (solids concentration approx. 82 g/l) was mixed with 1.9 m$^3$ of precipitated silica B (solids concentration approx. 63 g/l) in a stirred vessel. The mixture that was obtained was filtered; the filter cake was then liquefied with some acid ad sprayed on to a jet type drier. The analysis data are summarized in Table 1.

TABLE 1

Comparison of the analysis data from examples 2–4 and silica fractions A and B

| | Silica fraction A | Silica fraction B | Difference between fractions A:B in % | Example 1 | Example 2 | Example 3 |
|---|---|---|---|---|---|---|
| Water content | 5.0 | 5.0 | 0 | 4.9 | 4.5 | 4.9 |
| pH | 5.5 | 6.0 | 2.3 | 5.5 | 5.3 | 5.0 |

TABLE 1-continued

Comparison of the analysis data from examples 2–4 and silica fractions A and B

| | Silica fraction A | Silica fraction B | Difference between fractions A:B in % | Example 1 | Example 2 | Example 3 |
|---|---|---|---|---|---|---|
| BET m²/g | 170 | 190 | 10.5 | 171 | 167 | 180 |
| CTAB m²/g | 160 | 175 | 8.5 | 169 | 164 | 171 |
| DBP ml/100 g | 300 | 230 | 30 | 261 | 258 | 260 |
| Alpine screen residue 63 μm | * | 99 | — | 98 | 97 | 99 |
| Alpine screen residue 180 μm | * | 94 | — | 79 | 77 | 90 |

* = not determined, as no stable beads, only powder

The silica fractions A and B differed in regard to DBP absorption by 30% and the BET surface area by more than 10%.

In the following examples, two silica fractions (according to EP 0 983 966) and B (according to Example 4) were prepared and the suspensions obtained in this way were mixed according to the present invention.

Example 4

A precipitation was carried out by adding 117 m³ of water, 2.7 m³ of water glass, water glass consumption in stage 1 of 12.9 m³ in 75 minutes and sulfuric acid consumption in stage 1 of 1906.2 l in 75 minutes. The re-acidification was carried out with sulfuric acid in approx. 30 minutes to a PH of approx. 8.5. There was a 30-minute interruption before re-acidification II was carried out with sulfuric acid in approx. 30 minutes to a pH of 4.4. The precipitation temperature was 88° C. The acid and the water glass were used in the usual concentrated form.

Example 5

The precipitation suspensions of silica fractions A and B were mixed in a ratio of 50:50. The solids content of both precipitation suspensions before they were mixed was approx. 90 g/l. The silica fractions A and B were mixed in a stirred vessel. The resulting mixture had a solids content of 81 g/l. The mixture was filtered; the filter cake was liquefied with some acid and sprayed on to a spray drier. The analysis data are summarized in Table 2.

Example 6

The powders from the dried silica fraction A and B were mixed in a ratio of 50:50 in a mixer and subsequently granulated in order to obtain dust-free silica. The analysis data are summarized in Table 2.

TABLE 2

Comparison of the analysis data from Examples 5 and 6 and the silica fractions A and B

| | Silica fraction A | Silica fraction B | Difference between fractions in % | Example 5 | Example 6 |
|---|---|---|---|---|---|
| Water content | 5.5 | 5.5 | | 4.9 | 4.9 |
| pH | 5.5 | 6.0 | | 5.8 | 7.1 |
| BET m²/g | 120 | 125 | 4 | 125 | 132 |
| CTAB m²/g | 120 | 120 | 0 | 123 | 121 |
| DBP ml/100 g (free from water) | 252 | 225 | 12 | 268 | 199 |

The fractions differ in regard to DBP absorption by more than 10%.

Embodiments

The following substances were used:

| | |
|---|---|
| Krynol 1712 | Styrene-butadiene-rubber based on emulsion polymerization |
| X 50 S | 50:50 blend of Si 69 (bis(3-triethoxysilylpropyl)-tetrasulfane |
| ZnO RS | Zinc oxide |
| Stearic acid | |
| Lipoxol 4000 | Polyethylene glycol |
| Vulkanox 4020 | N-(1,3-dimethylbutyl)-N'-phenyl-p-phenylene diamine |
| DPG | Diphenylguanidine |
| CBS | N-cyclohexyl-2-benzthiazylsulfenamide |
| Sulfur | |

Silicas according to the present invention according to Examples 5 and 6 and the standard silicas Ultrasil VN3 GR and VN3 GR (Degussa AG) were added to a pure E-SBR compound (values in phr):

| Example | 7 Silica from Example 6 | 8 Silica from Example 5 | 9 VN2 | 10 VN3 |
|---|---|---|---|---|
| Krynol 1712 | 137.5 | 137.5 | 137.5 | 137.5 |
| Amount KS | 50 | 50 | 50 | 50 |
| X 50 S | 3 | 3 | 3 | 3 |
| ZnO RS | 3 | 3 | 3 | 3 |
| Stearic acid | 1 | 1 | 1 | 1 |
| Vulkanox 4020 | 2 | 2 | 2 | 2 |
| Lipoxol 4000 | 1.5 | 1.5 | 1.5 | 1.5 |
| DPG | 1.5 | 1.5 | 1.5 | 1.5 |
| CBS | 1.5 | 1.5 | 1.5 | 1.5 |
| Sulfur | 2.2 | 2.2 | 2.2 | 2.2 |
| Mooney viscosity ML (1 + 4), 1st stage | 75 | 71 | 68 | 99 |
| Mooney viscosity ML (1 + 4), 2nd stage | 60 | 58 | 56 | 76 |
| t05 [%] | 14.1 | 14.1 | 17.5 | 18.8 |
| Tensile strength [MPa] | 9.2 | 10.8 | 9.4 | 9.5 |
| Modulus 300% [MPa] | 4.9 | 5.3 | not determinable | 4.3 |
| Enhancement index 300%/100% | 4.1 | 4.4 | not determinable | 3.6 |
| Elongation at break [%] | 440 | 470 | 290 | 510 |
| Shore hardness | 52 | 51 | 59 | 54 |
| E* 60° C. | 5.1 | 5.2 | 6.6 | 5.8 |
| tanδ 60° C. | 0.099 | 0.096 | 0.087 | 0.106 |
| E* 0° C. | 7.6 | 7.8 | 10.6 | 8.8 |
| tanδ 0° C. | 0.266 | 0.263 | 0.284 | 0.260 |
| Dispersivity, peak area | 12.6 | 1.9 | 6.4 | 25.7 |

-continued

| Example | 7 Silica from Example 6 | 8 Silica from Example 5 | 9 VN2 | 10 VN3 |
|---|---|---|---|---|
| topography Dispersivity, number of peaks 2–5 μm | 129 | 27 | 89 | 602 |

Compared to the silica in Example 6 with a similar surface area the silicas according to the present invention according to Example 5 produced lower mixing viscosities (which represents an improvement in the manufacture of the mixture), higher tensile strength, a higher modulus value, a higher enhancement index, higher elongation at break and a considerably improved dispersivity (which corresponds to better abrasion behavior). Both silicas demonstrate considerably improved dispersivity and a better enhancement index compared to the standard silicas Ultrasil VN2 GR and VN3 GR.

The dispersivity was determined according to A. Wehmeier, "Charakterisierung der Füllstoffdispersion" by means of surface area topography, DKG conference Bad Neuenahr, Sep. 30, 1999.

German patent application 101112652.2 filed Mar. 16, 2001, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed is:

1. A silica comprising:
   at least two silica fractions;
   wherein at least two silica fractions differ by at least 10% in at least one measured value for a BET surface area, a CTAB surface area and a DBP absorption,
   wherein said silica is in the form of particles with an average particle size of more than 80 μm.

2. The silica according to claim 1, wherein the silica exhibits a BET surface area of 80–300 m$^2$/g, a CTAB surface area of 80–300 m$^2$/g, and a DBP absorption 150–350 g/100 g.

3. The silica according to claim 1, wherein an amount of the silica fractions in the silica is between 5 and 95% by weight based on a total weight of dry silica.

4. The silica according to claim 1, wherein the silica is hydrophobized.

5. The silica according to claim 1, wherein at least one of the silica fractions is hydrophobized.

6. The silica according to claim 1, wherein one or more of the silica fractions is a precipitated silica.

7. The silica according to claim 1, wherein the silica fractions are manufactured by precipitating silicate with an acid, thereby obtaining a precipitation suspension; and mixing of at least two precipitation suspensions.

8. The silica according to claim 1, wherein the silica fractions are manufactured by precipitating silicate with an acid, thereby obtaining a precipitation suspension, filtering the precipitation suspension, thereby obtaining a filter cake; and mixing at least two filter cakes.

9. The silica according to claim 1, wherein the silica fractions are manufactured by precipitating silicate with an acid, thereby obtaining a precipitation suspension; filtering said precipitation suspension, thereby obtaining a filter cake; re-suspending the filter cake or suspending a dried silica, thereby obtaining at least two second suspensions; and mixing at least two of the second suspensions.

10. The silica according to claim 1, wherein one or more of the silica fractions is a fumed silica.

11. The silica according to claim 1 or 10, wherein the silica fractions are mixed in a dry state.

12. A process for manufacturing a silica containing at least two silica fractions, comprising:
   mixing at least two silica fractions, which differ by at least 10% in at least one measured value for a BET surface area, a CTAB surface area and a DBP absorption,
   wherein the silica fractions are present in particle form with an average particle diameter of more than 80 μm.

13. The process according to claim 12, wherein the silica exhibits a BET surface area of 80–300 m$^2$/g; a CTAB surface area of 80–300 m$^2$/g; and a DBP absorption of 150–350 g/100 g.

14. The process according to claim 13, wherein an amount of the silica fractions in the silica is between 5 and 95% by weight based on a total weight of dry silica.

15. The process according to claim 12, wherein the silica is hydrophobized.

16. The process according to claim 12, wherein at least one of the silica fractions is hydrophobized.

17. The process according to claim 12, wherein one or more of the silica fractions is a precipitated silica.

18. The process according to claim 12, wherein the silica fractions are manufactured by precipitating silicate with an acid, thereby obtaining a precipitation suspension; and mixing of at least two of the precipitation suspensions.

19. The process according to claim 12, wherein the silica fractions are manufactured by precipitating silicate with an acid, thereby obtaining a precipitation suspension; filtering said precipitation suspension, thereby obtaining a filter cake; and mixing at least two of the filter cakes.

20. The process according to claim 12, wherein the silica fractions are manufactured by precipitating silicate with an acid, thereby obtaining a precipitation suspension; filtering said precipitation suspension, thereby obtaining a filter cake; re-suspending the filter cake or suspending a dried silica, thereby obtaining at least two second suspension; and mixing at least two of the second suspensions.

21. The process according to claim 12, wherein one or more of the silica fractions is a fumed silica.

22. The process according to claim 21, wherein the silica fractions are mixed in a dry state.

23. An elastomer compound, comprising:
   the silica according to claim 1 as a filler.

* * * * *

UNITED STATES PATENT AND TRADEMARK OFFICE
CERTIFICATE OF CORRECTION

PATENT NO.    : 6,702,887 B2                                      Page 1 of 1
DATED         : March 9, 2004
INVENTOR(S)   : Uhrlandt et al.

It is certified that error appears in the above-identified patent and that said Letters Patent is hereby corrected as shown below:

<u>Title page,</u>
Item [73], should read:
-- [73]   Assignee:       Degussa AG, Duesseldorf (DE) --
Item [75], should read:
-- [75]   Inventors:      Stefan Uhrlandt, Niederkassel (DE);
                          Ralf Schmoll, Bonn (DE); Anke Blume,
                          Weilerswist (DE); **Detlef
                          Luginsland**, Köln (DE) --

Signed and Sealed this

First Day of June, 2004

JON W. DUDAS
*Acting Director of the United States Patent and Trademark Office*